United States Patent [19]
Ishida et al.

[11] Patent Number: 5,938,553
[45] Date of Patent: Aug. 17, 1999

[54] LOW NOISE CHAIN

[75] Inventors: Hiroki Ishida, Osaka; Toshihiro Hosokawa, Takatsuki; Sachihiko Maeda, Hirakata; Takahisa Andoh, Osaka, all of Japan

[73] Assignee: Tsubakimoto Chain Co., Osaka, Japan

[21] Appl. No.: 08/922,552

[22] Filed: Sep. 3, 1997

[30] Foreign Application Priority Data

Sep. 3, 1996 [JP] Japan ................................. 8-233053

[51] Int. Cl.$^6$ .......................... F16G 13/02; F16G 13/04
[52] U.S. Cl. ............................................ 474/208; 474/212
[58] Field of Search .................................... 474/202, 206, 474/208, 212

[56] References Cited

U.S. PATENT DOCUMENTS

| | | | |
|---|---|---|---|
| 1,737,150 | 11/1929 | Davis | 474/208 |
| 1,894,600 | 1/1933 | Schmidt | 474/208 |
| 2,129,407 | 9/1938 | Dalrymple | 474/208 |
| 2,909,938 | 10/1959 | Sharp . | |
| 3,178,239 | 4/1965 | Zeller | 474/208 |
| 4,690,665 | 9/1987 | Oliver et al. | 474/245 |
| 4,766,997 | 8/1988 | Hannum | 474/208 |

FOREIGN PATENT DOCUMENTS

| | | |
|---|---|---|
| 35-9602 | 5/1935 | Japan . |
| 40-22575 | 8/1940 | Japan . |
| 616477 | 7/1978 | U.S.S.R. ................................. 474/208 |

*Primary Examiner*—John A. Jeffery
*Assistant Examiner*—Matthew A. Kaness
*Attorney, Agent, or Firm*—Armstrong, Westerman, Hatgtori, McLeland & Naughton

[57] ABSTRACT

A barrel-shaped coil spring roller is formed by closely winding spring wire rods having fine crepe-like concave-convex surfaces on the surface of the barrel-shaped coil spring roller. The fine crepe-like concave-convex surfaces serve as a lubricating oil reservoir and are formed by a shotpeening process. Lubricating oil is retained on the fine crepe-like concave-convex surfaces formed by the shot-peening process. Sliding noises between the spring wire rods adjacent to each other, which noises are generated by elastic deformation of the barrel-like coil spring roller when in engagement with the toothed surface of the sprocket, are reduced by the lubricating oil. The wear on both of the barrel-shaped coil spring roller and the sprocket is lessened and the power loss is reduced. The low noise chain is capable of retaining a lubricating oil on the surface of spring wire rods of a barrel-shaped coil spring roller for long periods of time, while still maintaining a noise reduction effect.

6 Claims, 4 Drawing Sheets

LOW NOISE CHAIN

FIELD OF THE INVENTION

The present invention relates to a low noise chain, and more particularly to a low noise chain using a barrel-shaped coil spring roller.

DESCRIPTION OF THE RELATED ART

U.S. Pat. No. 2,909,938 and Japanese Utility Model Publication Nos. 35-9602 and 40-22575 disclose a chain using a coil spring roller which has been formed by winding spring wire rods, instead of using a steel-made cylindrical roller, for the purpose of reducing operating noises of a roller chain.

On the other hand, the present Applicant has proposed a coil spring roller having a coil spring that is barrel shaped in which spring wire rods formed with the barrel-shaped coil spring roller are always in contact with each other in order to lower a surface pressure when engaged with a toothed surface of a sprocket to enhance the strength thereof.

FIG. 3 shows one example of a low noise chain using a barrel shaped coil spring roller as described above. A chain 1 includes a pin 4 which extends rotatably and axially through a center of a bushing 3 and by which a pair of left and right inner plates 2, 2 are connected. Outer plates 5, 5 are fixedly fitted into opposite ends of the pin 4.

A barrel-shaped roller 6', formed by closely winding spring wire rods 6'A between the pair of inner plates 2,2 is rotatably fitted externally of the bushing 3.

FIGS. 4 (A)–(C) show different states in which the barrel-shaped coil spring roller 6 of the chain 1 is engaged with a sprocket 7. More particularly, FIG. 4(A) shows that the barrel-shaped coil spring roller 6 starts to engage a toothed surface 7A of the sprocket 7 on a pitch circle of the sprocket 7, and that the barrel-shaped coil spring roller comes into contact with the toothed surface 7A of the sprocket 7 at a central largest diameter portion of the outer peripheral surface of the barrel-shaped coil spring roller 6'.

When the engagement progresses as the sprocket 7 rotates, as shown in FIG. 4 (B), the side of the outer peripheral surface of the barrel-shaped coil spring roller 6' opposite to the toothed surface 7A is pressed against the toothed surface 7A and elastically deformed flatly from the central portion. The shock caused by a collision of the barrel-shaped coil spring roller 6' against the toothed surface 7A of the sprocket 7 during the process is dampened to suppress engaging noises.

Further, when the barrel-shaped coil spring roller 6' completely engages the sprocket 7, the portion of the outer peripheral surface of the barrel-shaped coil spring roller 6' opposite to the toothed surface 7A is elastically deformed into a flat shape along the toothed surface 7A, as shown in FIG. 4 (C).

As previously mentioned, in the low noise chain using the barrel-shaped coil spring roller formed by closely winding the spring wire rods, when the chain is engaged with the sprocket, the outer peripheral surface of the sprocket is pressed by the toothed surface of the sprocket and elastically deformed so that the spring wire rods adjacent to each other are slidably displaced.

It has been confirmed by experiments that when the chain is operated for a long period of time without forced lubrication, lubricating oil, such as grease which is initially coated on the barrel-shaped coil spring roller, scatters so that an oil film on the surface disappears whereby the sliding noises of the spring wire rods occur to lower the effect for reducing the noises.

In view of the foregoing, the present invention solves the problem as noted above with respect to the prior art. An object of the present invention is to provide a low noise chain which can retain lubricating oil on the surface of wire rods of a barrel-shaped coil spring roller for a long period of time and can continue the effect for reducing noises.

SUMMARY OF THE INVENTION

For achieving the aforementioned object, the present invention provides a low noise chain which includes a barrel-shaped coil spring roller formed by closely winding spring wire rods having fine crepe-like concave-convex surfaces serving as a lubricating oil reservoir processed by shot-peening on the surface thereof.

When the barrel-shaped coil spring roller engages the toothed surface of the sprocket, the barrel-shaped coil spring roller comes into contact with the toothed surface from a large portion of the central diameter thereof, to assume a complete engagement, while being elastically deformed along the toothed surface. At this time, the elastic deformation of the barrel-shaped coil spring roller causes dampening of shocks when engaging the toothed surface of the sprocket to suppress the occurrence of noises.

Since the barrel-shaped coil spring roller is formed by closely winding the wire rods, the surface pressure in the state of being completely engaged with the toothed surface of the sprocket is small, and the surface hardness and the fatigue strength of the wire rods are enhanced to improve the durability.

Further, lubricating oil is retained on the fine crepe-like concave-convex surfaces formed by the shot-peening process, the sliding sound between the adjacent spring wire rods resulting from the elastic deformation of the barrel-shaped coil spring roller when engaged with the toothed surface of the sprocket is reduced by the lubricating oil, and the wear and power loss resulting from the sliding are reduced.

BRIEF DESCRIPTION OF THE DRAWING FIGURES

Figure 4A:
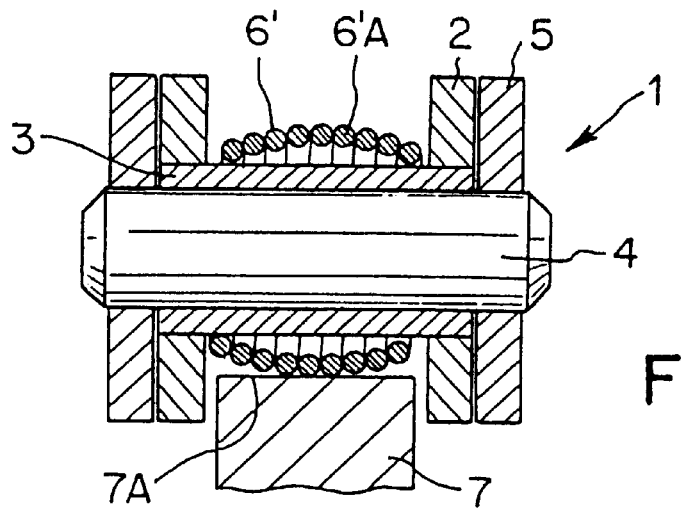
Figure 4B:
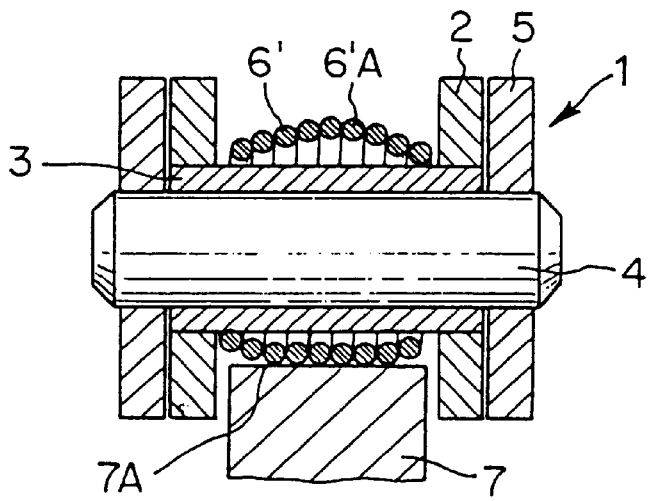
Figure 4C:
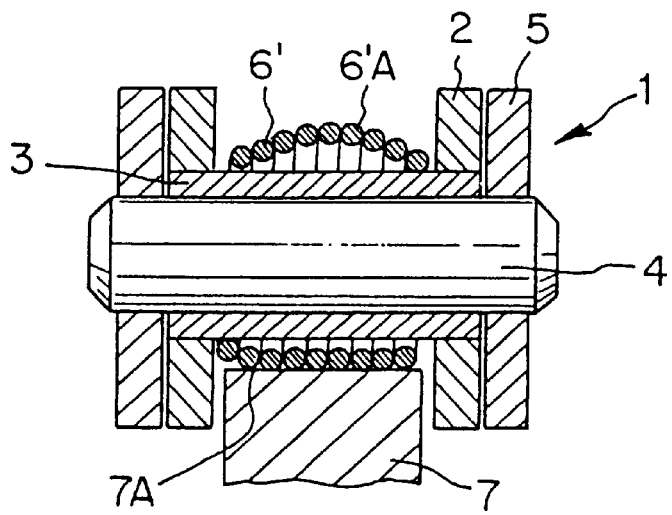

FIGS. 4(A), 4(B), and 4(C) are views showing the engaging course between the barrel-shaped coil spring roller and the toothed surface of the sprocket of the low noise chain of the present invention, wherein FIG. 4(A) illustrates the start of the engagement, FIG. 4(B) illustrates the progression of the engagement, and FIG. 4(C) illustrates the completion of the engagement.

DETAILED DESCRIPTION OF THE INVENTION

Figure 3:
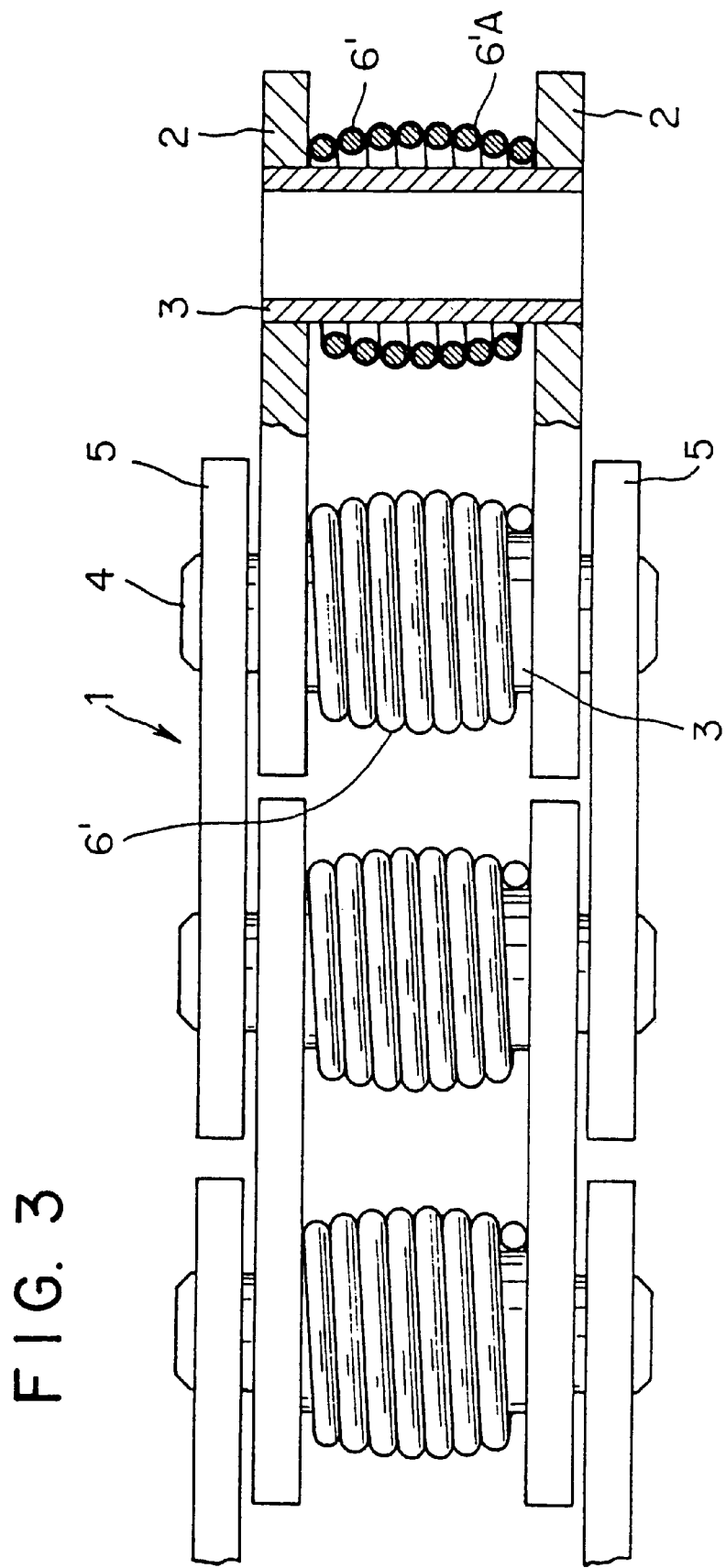
FIG. 3 is a view showing one example of the low noise chain of the present invention using the barrel-shaped coil spring roller.

The preferred embodiments of the present invention will be described hereinafter with reference to the drawings. Since the construction of the basic chain itself are the same as those shown in FIGS. 3 and 4 which have been previously described above except for the barrel-shaped coil spring roller and the engaging operation with the sprocket, an explanation of those like parts will not be repeated and only the construction of the barrel-shaped coil spring will be explained below.

Figure 1A:
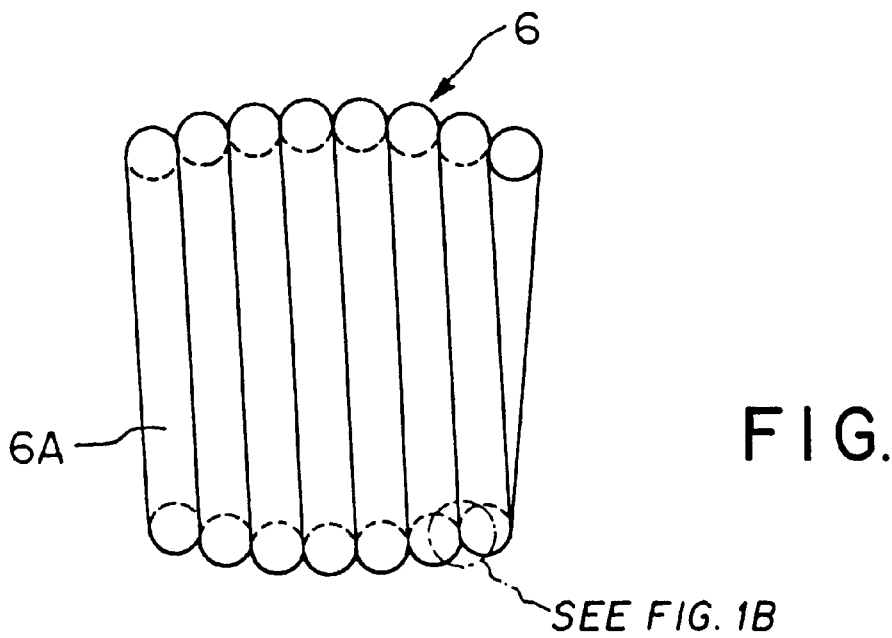
FIG. 1 is a view showing a state of the surface of the barrel-shaped coil spring roller used in the low noise chain according to the present invention.
Figure 1B:
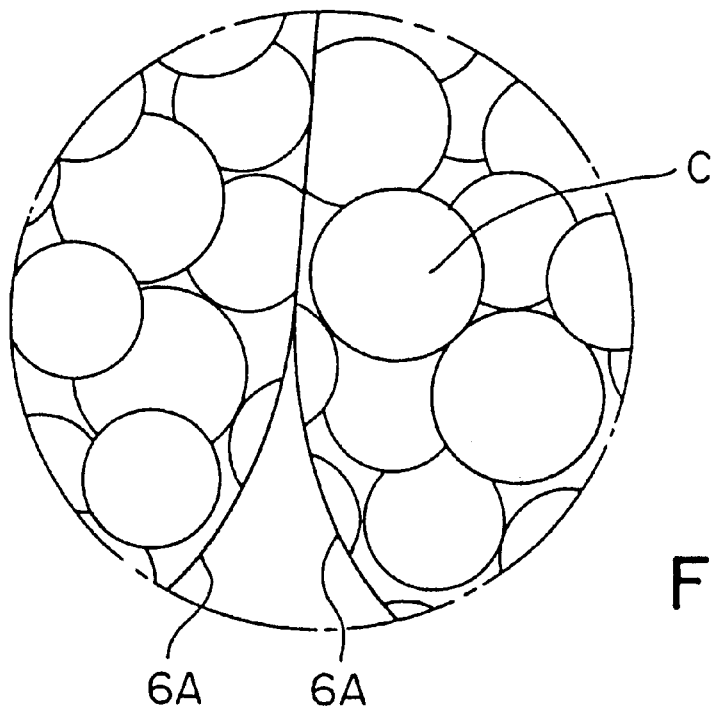

FIG. 1 is partly enlarged view of an improved barrel-shaped coil spring roller using a low noise chain showing one embodiment of the present invention. In a barrel-shaped coil spring roller 6 numerous fine crepe-like concave-convex surfaces C are formed on the surfaces of spring wire rods 6A thereof by the special shot-peening process.

In the shot-peening process, a particle diameter in the range of from 0.02 mm to 0.06 mm is used for the shot, and since the particle diameters in the given range are relatively small, the shot can enter any one of the inner surface of the barrel-shaped coil spring roller and a minute gap between the spring wire rods closely adjacent to each other which have been difficult for the shot to enter previously when the shot had the typical particle diameter used in general shot-peening processes formerly applied to mechanical parts. A residual compression stress remains on the surface of the wire rods, and the aforementioned crepe-like concavo-convex surfaces can be formed as a lubricating oil reservoir.

Figure 2:
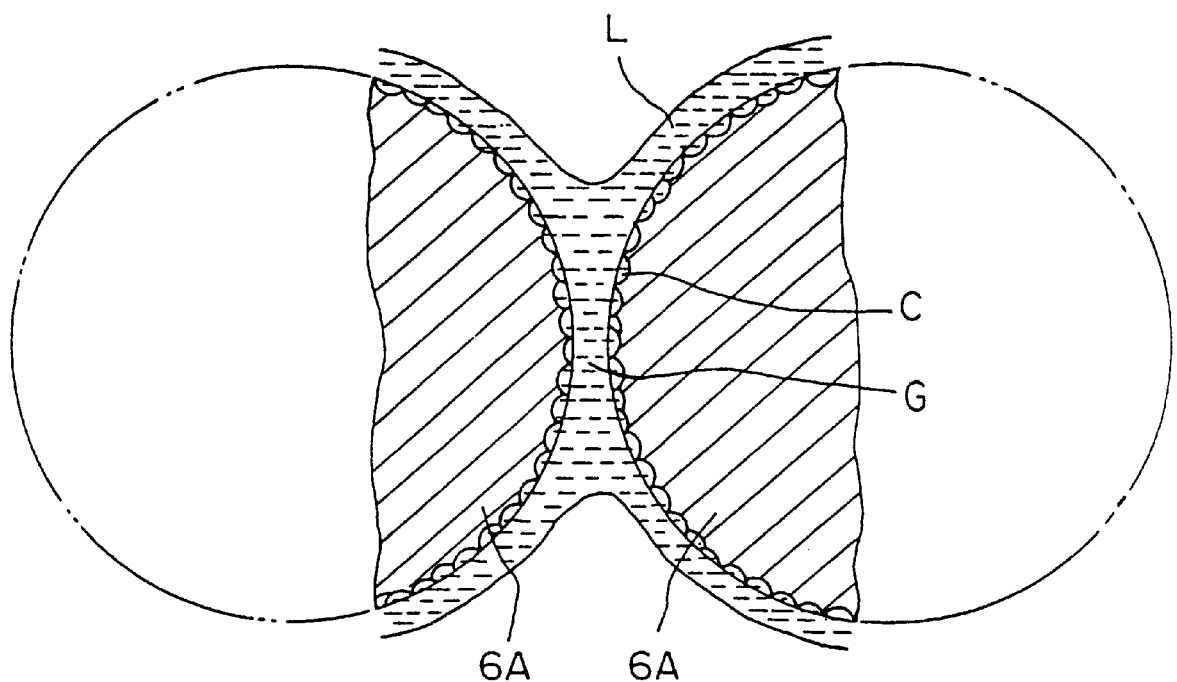
FIG. 2 is a view showing the lubricating state of the barrel-shaped coil spring roller in the low noise chain according to the present invention.

FIG. 2 is a schematic view showing a state in which lubricating oil is retained between the spring wire rods 6A of the barrel-shaped coil spring roller 6 subjected to the shot-peening process. As shown in FIG. 2, lubricating oil L, such as grease coated on the barrel-shaped coil spring roller 6, is caught by the numerous crepe-like concave-convex surfaces C formed on the surfaces of the spring wire rods 6A and stays thereon for long periods of time.

Particularly, the lubricating oil L, entering the gap G between the spring wire rods 6A, 6A closely adjacent to and opposed to each other, is caught by the crepe-like concavo-convex surfaces C on both sides and confined in the gap G. Therefore, even if the barrel-shaped coil spring roller 1 engages the sprocket, and when being disengaged from the sprocket, the barrel-shaped coil spring roller 1 is elastically deformed so that spring wire rods 6A adjacent to each other are relatively slidably moved, and their direct contact is obstructed by the lubricating oil L in the gap G so that no sliding noise occurs.

Further, the lubricating oil L stored in the crepe-like concave-convex surfaces C of the spring wire rods 6A on the inner peripheral surface side and outer peripheral surface side of the barrel-shaped coil spring roller 1 prevents the direct contact between the spring wire rods 6A and any one of the bushings of the chain and the sprocket toothed surface to suppress the wear.

As described above, according to the low noise chain of the present invention, a barrel-shaped coil spring roller is used which is formed by closely winding spring wire rods having fine crepe-like concave-convex surfaces, serving as a lubricating oil reservoir processed by shot-peening, on the surface thereof. Therefore, the lubricating oil, such as grease initially coated on any one of the inner peripheral surface and the outer peripheral surface of the barrel-shaped coil spring roller, can be retained for long periods of time. Particularly, the lubricating oil, initially coated on the crepe-like concave-convex surfaces between the spring wire rods closely adjacent to and opposed to each other, is confirmed to prevent the lubricating oil from scattering outside. Thus, the occurrence of the sliding noise caused by the direct contact between the spring wire rods can be obstructed by the oil film to maintain the noise reduction effect for long periods of time. Further, by retaining the oil film on the surfaces of the spring wire rods, it is possible to reduce the sliding resistance of the spring wire rods and the power loss due to the sliding between the barrel-shaped coil spring roller and any one of the toothed surface of the sprocket and the bushings.

Furthermore, since the barrel-shaped coil spring roller is formed by closely winding the spring wire rods, the contact surface pressure, when in engagement with the toothed surface of the sprocket, can be lowered, and the fatigue strength and the surface strength of the spring wire rod itself can be enhanced by the shot-peening process to thus improve the durability thereof.

We claim:

1. A low noise chain, comprising:
   a barrel-shaped coil spring roller formed of closely wound spring wire rods;
   means for retaining lubricating oil, wherein said means for rataining lubricating oil are fine crepe-like concave-convex surfaces on surfaces of said closely wound spring wire rods of said barrel-shaped coil spring roller and said fine crepe-like concave-convex surfaces are formed by a shot-peening process.

2. The low noise chain of claim 1, wherein said barrel-shaped coil spring roller comes into engagement with a toothed surface of a sprocket from a large portion of a central diameter of said barrel-shaped coil spring roller.

3. The low noise chain of claim 2, wherein said barrel-shaped coil spring roller is elastically deformed along the toothed surface of the sprocket as said barrel-shaped coil spring comes into engagement with the toothed surface of the sprocket in order to dampen a shock due to said engagement with the toothed surface of the sprocket and thus, suppress noise.

4. The low noise chain of claim 3, wherein said barrel-shaped coil spring roller is in a state of being completely engaged with the toothed surface of the sprocket so that said barrel-shaped coil spring roller is elastically deformed into a flat shape along the toothed surface the sprocket.

5. The low noise chain of claim 1, wherein said fine crepe-like concave-convex surfaces are formed by said shot-peening process and said shot-peening process uses shot having a particle diameter size in the range of 0.02 mm to 0.06 mm.

6. The low noise chain of claim 1, further comprising a gap between a first spring wire rod of said closely wound spring wire rods which is adjacent to a second spring wire rod of said closely wound spring wire rods so that a lubricating oil coated on said barrel-shaped coil spring roller is caught by said fine crepe-like concave-convex surfaces formed on both a surface of said first spring wire rod and said second spring wire rod to be confined in said gap.

* * * * *